US010195905B2

(12) United States Patent
Kato

(10) Patent No.: US 10,195,905 B2
(45) Date of Patent: Feb. 5, 2019

(54) PNEUMATIC TIRE

(71) Applicant: BRIDGESTONE CORPORATION, Chuo-ku, Tokyo (JP)

(72) Inventor: Keiichi Kato, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 571 days.

(21) Appl. No.: 14/786,634

(22) PCT Filed: Apr. 21, 2014

(86) PCT No.: PCT/JP2014/002241
§ 371 (c)(1),
(2) Date: Oct. 23, 2015

(87) PCT Pub. No.: WO2014/174830
PCT Pub. Date: Oct. 30, 2014

(65) Prior Publication Data
US 2016/0075184 A1 Mar. 17, 2016

(30) Foreign Application Priority Data

Apr. 25, 2013 (JP) ................................ 2013-092893

(51) Int. Cl.
*B60C 11/04* (2006.01)
*B60C 11/12* (2006.01)
(Continued)

(52) U.S. Cl.
CPC ........ *B60C 11/032* (2013.01); *B60C 11/0304* (2013.01); *B60C 11/0306* (2013.01);
(Continued)

(58) Field of Classification Search
CPC ... B60C 11/0304; B60C 11/032; B60C 11/12; B60C 19/002
See application file for complete search history.

(56) References Cited

U.S. PATENT DOCUMENTS

2009/0165908 A1* 7/2009 Takahashi ........... B60C 11/0306
152/209.18

FOREIGN PATENT DOCUMENTS

CA      1159345 A   * 12/1983
CN    101454168 A      6/2009
(Continued)

OTHER PUBLICATIONS

Machine translation for Japan 2010-260403 (Year: 2017).*
(Continued)

*Primary Examiner* — Steven D Maki
(74) *Attorney, Agent, or Firm* — Kenja IP Law PC

(57) ABSTRACT

A pneumatic tire includes, in an inner land (4) portion, a first resonator (9) made up of a first sub-groove (9a), a first branch groove (9b) opening to one of two inner circumferential main grooves (2), and a first branch groove (9c) opening to the other one of the two inner circumferential main grooves (2), and also includes, in an external land portion (5), a second resonator (11) made up of a second sub-groove (11a) and a second branch groove (11b) that is opening to one of two external circumferential main grooves (3) and a third resonator (12) made up of a third sub-groove (12a) and a third branch groove (12b) that is opening to the other one of the two external circumferential main grooves (3). The second resonator (11) and the third resonator (12) have groove widths smaller than the groove width of the first resonator (9).

12 Claims, 2 Drawing Sheets

(51) Int. Cl.
  *B60C 11/03*   (2006.01)
  *B60C 11/13*   (2006.01)
  *B60C 19/00*   (2006.01)

(52) U.S. Cl.
  CPC ...... *B60C 11/0327* (2013.01); *B60C 11/0332* (2013.01); *B60C 11/12* (2013.01); *B60C 11/13* (2013.01); *B60C 19/002* (2013.01); *B60C 2011/0353* (2013.01)

(56)  References Cited

FOREIGN PATENT DOCUMENTS

| | | | |
|---|---|---|---|
| CN | 102470701 A | | 5/2012 |
| EP | 1964691 A1 | | 9/2008 |
| EP | 2011671 A1 | | 1/2009 |
| JP | 62-103205 A | * | 5/1987 |
| JP | H06-16106 U | | 3/1994 |
| JP | 2006-001312 A | | 1/2006 |
| JP | 2007168597 A | | 7/2007 |
| JP | 2007-269144 A | | 10/2007 |
| JP | 2010-260403 A | * | 11/2010 |
| JP | 2010-260413 A | | 11/2010 |
| JP | 2010269776 A | | 12/2010 |
| JP | 2011-140268 A | | 7/2011 |
| WO | 2007/114430 A1 | | 10/2007 |

OTHER PUBLICATIONS

Machine translation for Japan 62-103205 (Year: 2018).*
Jul. 22, 2014 International Search Report issued in International Patent Application No. PCT/JP2014/002241.

* cited by examiner

Cross-sectional view taken along the line A-A'

Cross-sectional view taken along the line B-B'

PNEUMATIC TIRE

TECHNICAL FIELD

This disclosure relates to a pneumatic tire.

BACKGROUND

A pneumatic tire has been required to reduce a noise and improve quietness when a vehicle is running. As such, there is a technique to reduce an external noise of the vehicle by using a resonator (i.e., what is called a Helmholtz resonator) constituted by using a gas chamber and a branch groove.

For example, PLT 1 set forth below suggests a technique having one circumferential main groove formed on a tread surface and a circumferential sub-groove intermittently extending in a tread circumferential direction within a land portion adjacent to the circumferential main groove, wherein the circumferential sub-groove opens to the circumferential main groove via one inclined groove.

CITATION LIST

Patent Literature

PLT 1: JP-A-2011-140268

SUMMARY

Technical Problem

However, such a structure of the resonator has an aspect to reduce a footprint area because of the grooves formed in the land portion of the tire. Especially, since steering stability and wet braking performance when the vehicle is turning vary according to the footprint area, in order to maintain the steering stability and the like at a high level while reducing the noise, there has still been room for consideration. Here, when the circumferential main groove that causes the noise is reduced too much, drainage performance becomes deteriorated as a result. Therefore, it has been expected to achieve the improvement as described above without reducing the circumferential main groove too much.

In consideration of the above problem, it could be helpful to provide a pneumatic tire capable of reducing the noise caused by the circumferential main groove without compromising the drainage performance and, also, maintaining the steering stability and the wet braking performance at a high level.

Solution to Problem

A pneumatic tire according to the disclosure herein having an internal half of a tread surface from a tire equatorial plane in a state that the pneumatic tire is mounted on a vehicle, the internal half having a plurality of internal circumferential main grooves extending in a tread circumferential direction and an internal land portion defined by two internal circumferential main grooves adjacent to each other, and also having an external half of the tread surface from the tire equatorial plane in the state that the pneumatic tire is mounted on the vehicle, the external half having a plurality of external circumferential main grooves extending in the tread circumferential direction and an external land portion defined by two external circumferential main grooves adjacent to each other, the pneumatic tire including:

in the internal land portion, a plurality of first resonators, each made up of a first sub-groove with both ends terminating in the internal land portion, one first branch groove with a groove width narrower than the first sub-groove and opening to the first sub-groove and one of the two internal circumferential main grooves, and the other first branch groove with the groove width narrower than the first sub-groove and opening to the first sub-groove and the other one of the two internal circumferential main grooves; and in the external land portion, a plurality of second resonators, each made up of a second sub-groove with both ends terminating in the external land portion and a second branch groove with the groove width narrower than the second sub-groove and opening to the second sub-groove and one of the two external circumferential main grooves, as well as a plurality of third resonators, each made up of a third sub-groove with both ends terminating in the external land portion and a third branch groove with the groove width narrower than the third sub-groove and opening to the third sub-groove and the other one of the two external circumferential main grooves, wherein a groove volume of the first resonator is larger than the groove volumes of the second resonator and the third resonator.

According to the above structure, a noise caused by the circumferential main groove may be reduced and, further, steering stability and wet braking performance may be maintained at a high level.

Here, the "groove width" refers to an opening width in a reference state in which the pneumatic tire is mounted on an approved rim, filled with a prescribed internal pressure, and having no load applied thereto. Also, the "groove volume" refers to a volume of space formed between a ground surface and the groove in the reference state. Here, the "approved rim" refers to a rim defined by an industrial standard effective in an area where the tire is produced and used, such as JATMA (Japan Automobile Tire Association) YEAR BOOK of Japan, ETRTO (European Tyre and Rim Technical Organisation) STANDARD MANUAL of Europe, TRA (THE TIRE and RIM ASSOCIATION INC.) YEAR BOOK of the United States, and the like. Further, the "prescribed internal pressure" refers to an internal pressure (a maximum air pressure) corresponding to a maximum load capacity of the tire in approved size that meets the standard such as the JATMA and is mounted on the approved rim.

In the pneumatic tire according to the disclosure herein, preferably, the groove width of the internal circumferential main groove is wider than that of the external circumferential main groove. Especially for a vehicle with a camber angle, since the internal half of the tread surface occupies a large portion of a ground contact region when the vehicle is running straight ahead, drainage performance is more sufficiently secured. Also, since a footprint area of the external half of the tread surface of the tire mounted on the vehicle may be secured, the steering stability may be further improved.

According to the pneumatic tire of the disclosure herein, preferably, the one first branch groove, the other first branch groove, the second branch groove, and the third branch groove have the groove width of 1 mm or less. Thereby, a reduction in the footprint area may be suppressed, further improving the steering stability.

Also, the pneumatic tire according to the disclosure herein preferably has a land portion in a rib-like shape continuously extending in the tread circumferential direction. Thereby, rigidity of the land portion on the tire equatorial plane that greatly contributes to handling performance may be improved, further improving the steering stability.

Further, according to the pneumatic tire of the disclosure herein, preferably, the second resonators and the third resonators are alternately arranged in the tread circumferential direction. Thereby, the rigidity may be well-balanced in the tread circumferential direction, achieving both quietness and the steering stability at a high level.

Advantageous Effect

According to the pneumatic tire of the disclosure herein, a noise caused by the circumferential main groove may be reduced and, further, the steering stability and the wet braking performance may be maintained at a high level.

DETAILED DESCRIPTION

Hereinafter, a pneumatic tire (hereinafter, also referred to as a tire) according to one embodiment of the disclosure herein will be described in detail by way of example with reference to the accompanying drawings. Note that internal structures of the tire such as a carcass, a belt and the like are similar to those according to conventional techniques, and thus descriptions thereof will be omitted.

Figure 1:
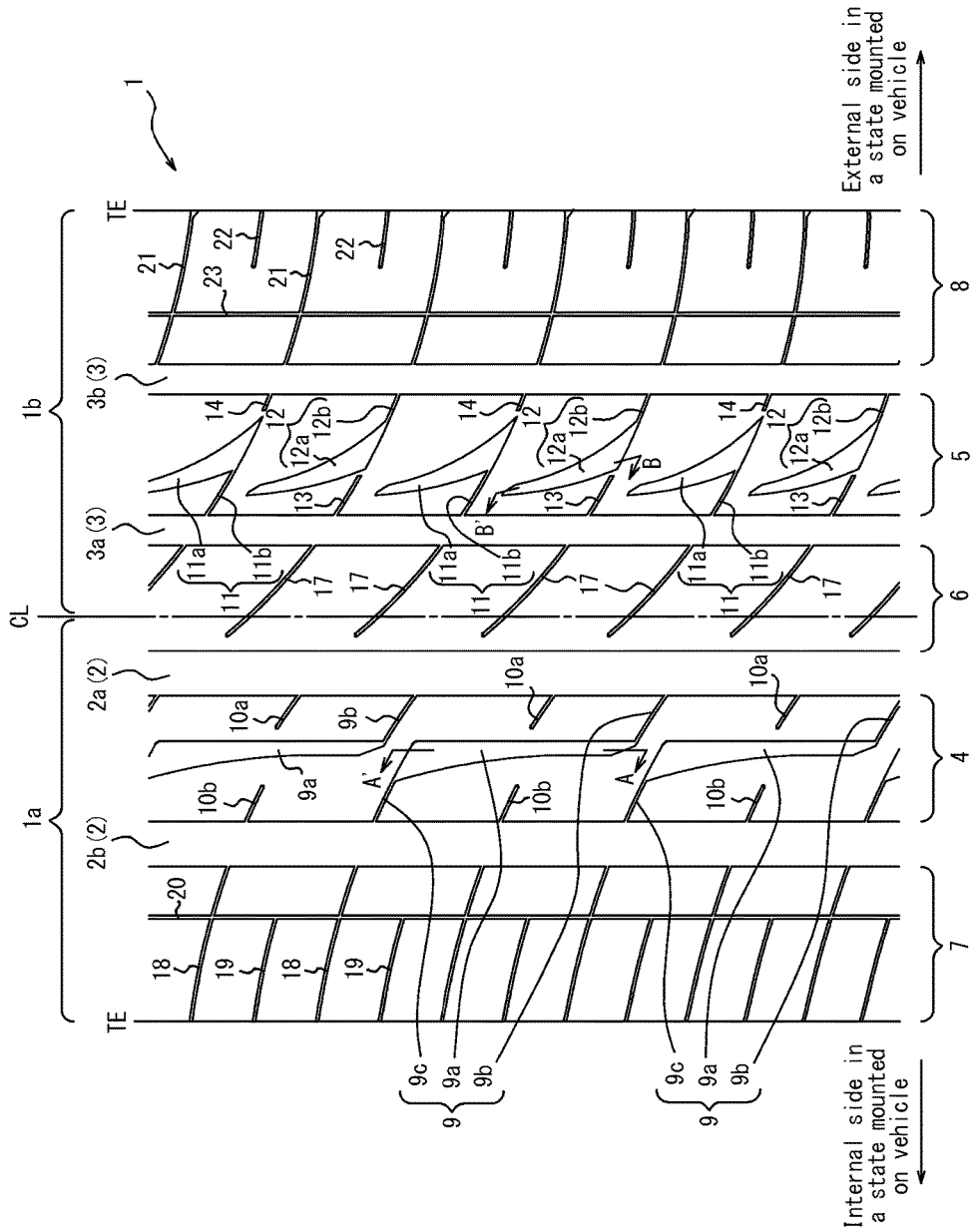
FIG. 1 is a development view illustrating a tread pattern of a pneumatic tire according to one embodiment.

FIG. 1 is a development view illustrating a tread pattern of the pneumatic tire according to one embodiment. As illustrated in FIG. 1, the pneumatic tire includes an internal half (an internal half 1a) of a tread surface 1 located inside from a tire equatorial plane CL in a state that the pneumatic tire is mounted on a vehicle. The internal half 1a has a plurality of internal circumferential main grooves continuously extending in a tread circumferential direction. In the figure, two internal circumferential main grooves 2a and 2b are provided. The pneumatic tire also includes an external half (an external half 1b) of the tread surface 1 located outside from the tire equatorial plane CL in the state that the pneumatic tire is mounted on the vehicle. The external half 1b has a plurality of external circumferential main grooves continuously extending in the tread circumferential direction. In the figure, two external circumferential main grooves 3a and 3b are provided. Note that the internal circumferential main grooves 2a and 2b have approximately the same groove width and the external circumferential main grooves 3a and 3b have approximately the same groove width, and the internal circumferential main grooves 2a and 2b have the groove widths wider than those of the external circumferential main grooves 3a and 3b.

As illustrated in FIG. 1, two internal circumferential main grooves 2 adjacent to each other define an internal land portion 4 therebetween, and two external circumferential main grooves 3 adjacent to each other define an external land portion 5 therebetween. Also, among the internal circumferential main grooves 2 and the external circumferential main grooves 3, the internal circumferential main groove 2a and the external circumferential main groove 3a those located innermost in a tread width direction, therebetween, define a central land portion 6 located on the tire equatorial plane CL. Further, among the internal circumferential main grooves 2 and the external circumferential main grooves 3, the internal circumferential main groove 2b and one tread end TE, therebetween, define an internal shoulder land portion 7 located in an internal shoulder area in the state that the pneumatic tire is mounted on the vehicle, and the external circumferential main groove 3b and the other tread end TE, therebetween, define an external shoulder land portion 8 located in an external shoulder area in the state that the pneumatic tire is mounted on the vehicle.

Here, the internal land portion 4, as illustrated in FIG. 1, includes a plurality of first resonators 9, each made up of a first sub-groove 9a with both ends terminating in the internal land portion 4, a first branch groove 9b with the groove width narrower than that of the first sub-groove 9a and opening to the first sub-groove 9a and one of the two internal circumferential main grooves 2 adjacent to each other (in the figure, the internal circumferential main groove 2a), and a first branch groove 9c with the groove width narrower than that of the first sub-groove 9a and opening to the first sub-groove 9a and the other one of the two internal circumferential main grooves 2 adjacent to each other (in the figure, the internal circumferential main groove 2b). In the figure, the first branch groove 9b is connected to one end of the first sub-groove 9a in the tread circumferential direction, and the first branch groove 9c is connected to the other end. Also, the first sub-groove 9a has the groove width gradually increasing from the end connected to the first branch groove 9b to the other end connected to the first branch groove 9c.

Further, in the internal land portion 4, between the first branch grooves 9b adjacent to each other in the tread circumferential direction (in the figure, approximately in the middle therebetween), a first narrow groove 10a is formed opening to the internal circumferential main groove 2a and terminating in the internal land portion 4. Similarly, between the first branch grooves 9c adjacent to each other in the tread circumferential direction (in the figure, approximately in the middle therebetween), a second narrow groove 10b is formed opening to the internal circumferential main groove 2b and terminating in the internal land portion 4.

As illustrated in FIG. 1, also, the external land portion 5 includes a plurality of second resonators 11, each made up of a second sub-groove 11a with both ends terminating in the external land portion 5, and a second branch groove 11b with the groove width narrower than that of the second sub-groove 11a and opening to the second sub-groove 11a and one of the two external circumferential main grooves adjacent to each other (in the figure, the external circumferential main groove 3a). Also, between two second resonators 11 adjacent to each other in the tread circumferential direction, a third resonator 12 is formed being made up of a third sub-groove 12a with both ends terminating in the external land portion and a third branch groove 12b with the groove width narrower than that of the third sub-groove 12a and opening to the third sub-groove 12a and the other one of the two external circumferential main grooves (in the figure, the external circumferential main groove 3b). In other words, in the external land portion 5, the second resonators 11 and the third resonators 12 are alternately arranged in the tread circumferential direction. In the figure, the second branch groove 11b is connected to one end of the second sub-groove 11a in the tread circumferential direction, and the third branch groove 12b is connected to one end of the third sub-groove 12a in the tread circumferential direction. Also, both the second sub-groove 11a and the third sub-groove 12a have the groove width gradually decreasing from one end thereof in the tread circumferential direction connected to the second branch groove 11b or the third branch groove 12b to the other end. Note that groove volumes of the second resonator 11 and the third resonator 12 are smaller than the groove volume of the first resonator 9.

The external land portion 5 further includes a third narrow groove 13 opening to the external circumferential main groove 3a and terminating in the external land portion 5 and a fourth narrow groove 14 opening to the external circumferential main groove 3b and terminating in the external land portion 5. In the figure, the third narrow groove 13 is located on a substantial extension line of the third branch groove 12b, and the fourth narrow groove 14 is located on a substantial extension line of the second branch groove 11b. In the figure, also, a space in the tread circumferential direction between the end of the second branch groove 11b and the end of the third narrow groove 13 those opening to the external circumferential main groove 3a is approximately the same as a space in the tread circumferential direction between the end of the third branch groove 12b and the end of the fourth narrow groove 14 those opening to the external circumferential main groove 3b. Further, since the third narrow groove 13 and the fourth narrow groove 14 terminate in the external land portion 5, the external land portion 5 is not completely separated into segments in the tread circumferential direction.

Figure 2A:
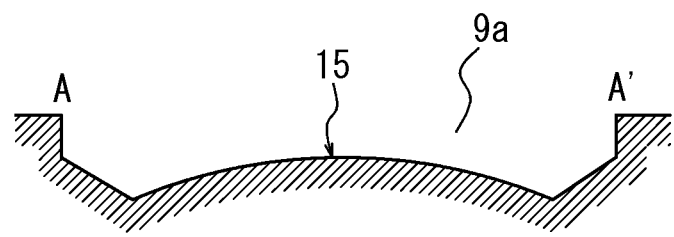
FIG. 2A is a cross-sectional view taken along the line A-A' of FIG. 1.
Figure 2B:
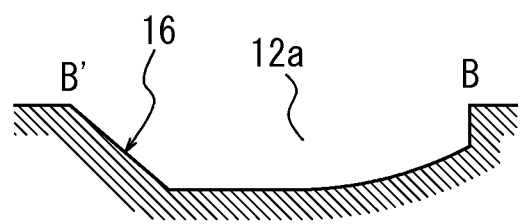
FIG. 2B is a cross-sectional view taken along the line B-B' in FIG. 1.

Here, FIG. 2A is a cross-sectional diagram taken along the line A-A' of FIG. 1. Also, FIG. 2B is a cross-sectional diagram taken along the line B-B' of FIG. 1. As illustrated in FIG. 2A, the first sub-groove 9a includes a raised bottom portion 15 formed in a portion thereof in its extending direction. In the figure, a groove depth gradually increases from a central portion in the extending direction of the groove to both ends. As illustrated in FIG. 2B, also, the third sub-groove 12a includes a raised bottom portion 16 formed at one end in the tread circumferential direction (at the end opposite to the end to which the third branch groove 12b is opening). Further, although not illustrated in the figure, the second sub-groove 11a, in a similar manner, includes the raised bottom portion 16 at one end in the tread circumferential direction (at the end opposite to the end to which the second branch groove 11b is opening).

The central land portion 6, as illustrated in FIG. 1, includes a plurality of fifth narrow grooves 17 obliquely extending in the tread width direction from the external circumferential main groove 3a across the tire equatorial plane CL and terminating in the central land portion 6. The plurality of fifth narrow grooves 17 are formed at intervals (in the figure, at regular intervals) in the tread circumferential direction. As illustrated in the figure, since the fifth narrow groove 17 terminates in the central land portion 6, the central land portion 6 has a rib-like shape extending on the tire equatorial plane CL in the tread circumferential direction.

As illustrated in FIG. 1, also, the internal shoulder land portion 7 includes a plurality of sixth narrow grooves 18 extending in the tread width direction and opening to the tread end TE and the internal circumferential main groove 2b. The sixth narrow grooves 18 are formed at intervals (in the figure, at regular intervals) in the tread circumferential direction. The internal shoulder land portion 7 also includes a plurality of seventh narrow grooves 19 internally extending in the tread width direction from the tread TE and terminating in the internal shoulder land portion 7. The seventh narrow groove 19 is formed between two sixth narrow grooves 18 adjacent to each other in the tread circumferential direction. The internal shoulder land portion 7 further includes an eighth narrow groove 20 extending in the tread circumferential direction. In the figure, the seventh narrow groove 19 terminates at a position intersecting with the eighth narrow groove 20. The sixth narrow grooves 18, the seventh narrow grooves 19, and the eighth narrow groove 20 function as edge components, and thus gripping performance may be secured.

As illustrated in FIG. 1, further, the external shoulder land portion 8 includes a plurality of ninth narrow grooves 21 extending in the tread width direction and opening to the tread end TE and the external circumferential main groove 3b. The ninth narrow grooves 21 are arranged at intervals (in the figure, at regular intervals) in the tread circumferential direction. The external shoulder land portion 8 also includes a plurality of tenth narrow grooves 22 internally extending from the tread TE in the tread width direction and terminating in the external shoulder land portion 8. The tenth narrow groove 22 is formed between two ninth narrow grooves 21 adjacent to each other in the tread circumferential direction. The external shoulder land portion 8 further includes an eleventh narrow groove 23 extending in the tread circumferential direction. In the figure, the eleventh narrow groove 23 is located further inside in the tread width direction than an end of the tenth narrow groove 22. The ninth narrow grooves 21, the tenth narrow grooves 22, and the eleventh narrow groove 23 function as the edge components, and thus the gripping performance may be secured.

In the tire of the present embodiment having a design as described above, the internal circumferential main grooves 2a and 2b are provided with a plurality of first resonators 9 communicating with both the internal circumferential main grooves 2, and the external circumferential main grooves 3a and 3b are provided with a plurality of second resonators 11 and a plurality of third resonators 12 those communicating with both the external circumferential main grooves 3. Thereby, the noise generated in the internal circumferential main grooves 2a and 2b and the external circumferential main grooves 3a and 3b may be reduced by the first resonators 9, the second resonators 11, and the third resonators 12. Also, since the internal half of the tread surface 1 in the state that the tire is mounted on the vehicle having great contribution to drainage performance is provided with two internal circumferential main grooves 2a and 2b and, further, the external half of the tread surface 1 in the state that the tire is mounted on the vehicle is provided with the external circumferential main grooves 3a and 3b, the drainage performance is sufficiently secured. Also, since groove volumes of the second resonators 11 and the third resonators 12 are smaller than those of the first resonators 9, a footprint area of the external half in the state that the tire is mounted on the vehicle, which is critical for steering stability when the vehicle is turning, is sufficiently secured, and thus the steering stability may be maintained at a high level. Further, land portions other than the internal land portion 4 and the external land portion 5 may have no resonators (or no resonators unnecessarily large in size). Thereby, the footprint area of the central land portion 6 located on the tire equatorial plane CL having great contribution to handling performance, the footprint area of the internal shoulder land portion 7 located in the shoulder area having great contribution to wet braking performance, and the footprint area of the external shoulder land portion 8 may be secured, thereby improving driving performance including the steering stability and the wet braking performance.

In the tire according to the present embodiment, also, the internal circumferential main grooves 2a and 2b formed in the internal half of the tread surface 1 in the state that the tire is mounted on the vehicle, which has great contribution to the drainage performance, have the groove widths wider than those of the external circumferential main grooves 3a and 3b formed in the external half of the tread surface 1 in the state that the tire is mounted on the vehicle. Thereby, the drainage performance is further secured. Especially for the vehicle with a camber angle, the internal half of the tread surface 1 in the state that the tire is mounted on the vehicle occupies a large portion of a ground contact region when the vehicle is running straight ahead. On the other hand, the external circumferential main grooves 3a and 3b in the external half of the tread surface 1 in the state that the tire is mounted on the vehicle, which has great contribution to the steering stability, have small groove widths. Thereby, the footprint area may be secured, thereby securing the steering stability and the like. In this manner, the tire according to the present embodiment may efficiently achieve both the drainage performance and the steering stability at a high level. Note that the groove widths of the internal circumferential main grooves 2a and 2b are not particularly limited but are preferably 5 to 20 mm. Also, the groove widths of the external circumferential main grooves 3a and 3b are smaller than those of the internal circumferential main grooves 2a and 2b and preferably, for example, 5 to 20 mm.

Also, the first branch grooves 9b and 9c formed in the internal land portion 4, and the second branch groove 11b and the third branch groove 12b formed in the external land portion 5 preferably have the groove width of 1 mm or less. Thereby, a reduction in the footprint area and the rigidity of the land portion may be suppressed, further improving the steering stability. On the other hand, in order to maintain quietness by causing the resonators 9, 11, and 12 to function, these branch grooves have the groove widths those allowing to open to a contact patch when the tire contacts the ground. Note that the first branch grooves 9b and 9c, the second branch groove 11b, and the third branch groove 12b may be either grooves or sipes. Further, the first narrow groove 10a and the second narrow groove 10b formed in the internal land portion 4 and the third narrow groove 13 and the fourth narrow groove 14 formed in the external land portion 5, from a similar viewpoint, preferably have the groove widths of 1 mm or less.

Further, the central land portion 6 continuously extending in the tread circumferential direction on the tire equatorial plane CL, as illustrated in FIG. 1, preferably has the rib-like shape. Since a location of the tire equatorial plane CL greatly contributes to the handling performance, the land portion in the rib-like shape having high rigidity may further improve the steering stability.

Also preferably, the second resonators 11 and the third resonators 12 provided in the external land portion 5, as illustrated in FIG. 1, are alternately arranged in the tread circumferential direction. Thereby, the rigidity in the tread circumferential direction may be well-balanced, achieving both the quietness and the steering stability at a high level.

As illustrated in FIG. 2A, also preferably, the first sub-groove 9a has the raised bottom portion 15 in the portion thereof in its extending direction. Thereby, the rigidity of the land portion is secured, further improving the steering stability. Also, the raised bottom portion 15 is preferably formed in a portion of the first sub-groove 9a that is not communicating with the first branch groove 9b or 9c (for example, as illustrated in FIG. 1, a central portion of the first sub-groove 9a in the extending direction). Thereby, when abrasion progresses, the first sub-groove 9a and the first branch grooves 9b and 9c are prevented from separating from one another and may maintain functioning as the resonator. In particular, a maximum groove depth of the first sub-groove 9a may be, for example, 5 to 8 mm. On the other hand, the groove depth (a minimum depth) of the raised bottom portion 15 of the first sub-groove 9a may be 3 to 6 mm.

As illustrated in FIG. 2B, further, the third sub-groove 12a preferably includes the raised bottom portion 16 in a portion thereof in its extending direction. Similarly, the second sub-groove 11a includes the raised bottom portion 16 in a portion thereof in its extending direction. Thereby, the rigidity of the land portion may be secured, further improving the steering stability. In particular, maximum groove widths of the second sub-groove 11a and the third sub-groove 12a may be, for example, 5 to 8 mm. On the other hand, the groove depth (the minimum depth) of the raised bottom portions 16 of the second sub-groove 11a and the third sub-groove 12a may be 3 to 6 mm. As illustrated in FIG. 1 and FIG. 2B, also, the end of the second sub-groove 11a and the end of the third sub-groove 12a communicating with the second branch groove 11b and the third branch groove 12b, respectively, are preferably not provided with the raised bottom portion 16 but have a deep groove depth. Thereby, these sub-groove and the branch groove are prevented from separating from one another when the abrasion progresses and may maintain functioning as the resonator.

Further, preferably, the internal land portion 4, the external land portion 5, and the central land portion 6 those located between two internal circumferential main grooves 2 adjacent to each other and two external circumferential main grooves 3 adjacent to each other have no grooves formed therein with both ends opening to the circumferential main grooves as described above and the groove width of over 1 mm. Thereby, the footprint area may be further secured, and thus the steering stability may be further secured. Also, all grooves and sipes formed in the internal shoulder land portion 7 and the external shoulder land portion 8 preferably have the groove width of 1 mm or less, from a viewpoint of securing the footprint area.

In the example illustrated in FIG. 1, in the external land portion 5, in order to secure the balance of the rigidity, the second resonators 11 (and the fourth narrow groove 14) and the third resonators 12 (and the third narrow groove 13) are arranged alternately at regular intervals in the tread circumferential direction. However, from a viewpoint of suppressing a pattern noise, the second resonators 11 (and the fourth narrow groove 14) and the third resonators 12 (and the third narrow groove 13) are preferably arranged at different intervals in the tread circumferential direction. Similarly, in the internal land portion 4, from the viewpoint of suppressing the pattern noise, the first resonators 9 (and the first narrow groove 10a and the second narrow groove 10b) are preferably arranged at different intervals in the tread circumferential direction. Further, the grooves (the fifth narrow groove 17 to the eleventh narrow groove 23) formed in other land portions (the central land portion 6, the internal shoulder land portion 7, and the external shoulder land portion 8) are preferably arranged at different pitches in the tread circumferential direction, from the viewpoint of suppressing the pattern noise.

In the example illustrated in FIG. 1, further, in the external land portion 5, since the third narrow groove 13 is arranged on the substantially extension line of the third branch groove 12b, and the fourth narrow groove 14 is arranged on the substantially extension line of the second branch groove 11b, the rigidity of the external land portion 5 in the tread width direction may be well-balanced, suppressing uneven abrasion.

EXAMPLES

In order to confirm effects of the disclosure herein, tires according to Examples 1 to 4 and Comparative Example 1 were produced as samples. The tire according to Example 1 has a tread pattern as illustrated in FIG. 1, and the tires according to Examples 2 to 4 and Comparative Example 1 have the same specifications as those of the tire according to Example 1, except for specifications illustrated in Table 1 shown below. Note that a "resonator with two branch grooves" refers to a resonator that, similarly to the first resonator 9 in FIG. 1, has two branch grooves with both ends opening to the main grooves adjacent to each other. Also, a "resonator with one branch groove" refers to a resonator that, similarly to the second resonator 11 and the third resonator 12 as illustrated in FIG. 1, has one branch groove with one end opening to one of the main grooves adjacent to each other. In other words, the resonator with two branch grooves, in order to reduce the noise in the two circumferential main grooves, has the groove volume larger than that of the resonator with one branch groove and thus has a reduced footprint area. Also, the "groove width" of the branch groove or the narrow groove refers to a width of the groove. Further, "two types of resonators in the external land portion" refers to a resonator that, similarly to the second resonator 11, opens to one of the main grooves adjacent to each other and a resonator that, similarly to the third resonator 12, opens to the other one of the main grooves adjacent to each other.

Each of the tires described above was of 245/60R16 in size and mounted on an approved rim, filled with a prescribed internal pressure, and mounted on the vehicle. Then, tests were conducted as described below.

<Quietness>

A noise generated from a lateral side of the tire when the tire run at a speed of 80 km/h on a room drum test machine under conditions defined by JASO C606 standard was measured so as to evaluate a columnar resonance sound. The result was evaluated as a relative value to an evaluation result of Comparative Example 1 set at 100. The larger the value, the better the quietness.

<Steering Stability>

Each of the above tires run on a dry road surface and the driving performance was evaluated based on driver's sensory perception. The result was evaluated as the relative value to the evaluation result of Comparative Example 1 set at 100. The larger the value, the better the steering stability.

<Wet Braking Performance>

Each of the above tires run on a wet road surface at an initial speed of 40 km/h, and a stopping distance by full braking was evaluated. The result was evaluated as the relative value to the evaluation result of Comparative Example 1 set at 100. The larger the value, the better the wet braking performance.

Each of the results of the evaluations described above is illustrated, together with the tire specifications, in Table 1 set forth below.

TABLE 1

| | Comparative Example 1 | Example 1 | Example 2 | Example 3 | Example 4 |
|---|---|---|---|---|---|
| Number of branch grooves of resonator in internal land portion | 2 | 2 | 2 | 2 | 2 |
| Number of branch grooves of resonator in external land portion | 2 | 1 | 1 | 1 | 1 |
| Relationship of groove width between internal circumferential main groove and external circumferential main groove | Groove width of internal circumferential main groove is wider | Groove width of internal circumferential main groove is wider | Groove width of external circumferential main groove is wider | Groove width of internal circumferential main groove is wider | Groove width of internal circumferential main groove is wider |
| Groove width (mm) | 1.0 | 1.0 | 1.0 | 1.2 | 1.0 |
| Shape of central land portion | Rib-like shape | Rib-like shape | Rib-like shape | Rib-like shape | Block-shape |
| Arrangement of two types of resonators in external land portion | Alternate | Alternate | Alternate | Alternate | Alternate |
| Quietness | 100 | 100 | 100 | 100 | 100 |
| Steering stability | 100 | 110 | 108 | 108 | 107 |
| Wet braking performance | 100 | 103 | 103 | 103 | 102 |

As illustrated in Table 1, each of the tires according to Examples 1 to 4, as compared with the tire according to Comparative Example 1, is capable of maintaining the quietness and, simultaneously, improving the steering stability and the wet braking performance. Also, as can be seen from a comparison between Example 1 and Example 2, when the groove width of the internal circumferential main groove is wider than that of the external circumferential main groove, the steering stability and the wet braking performance may be further improved. Also, as can be seen from a comparison between Example 1 and Example 3, when the groove widths of the first branch groove, the second branch groove, and the third branch groove are 1 mm or less, the steering stability becomes better. Further, as can be seen from a comparison between Example 1 and Example 4, when the central land portion located on the tire equatorial plane has the rib-like shape continuously extending in the tread circumferential direction, the steering stability may be further improved.

INDUSTRIAL APPLICABILITY

According to the disclosure herein, the pneumatic tire capable of maintaining the quietness and, also, improving the steering stability and the wet braking performance may be provided.

REFERENCE SIGNS LIST

1: tread surface, 2, 2a, 2b: internal circumferential main groove 3, 3a, 3b: external circumferential main groove, 4: internal land portion, 5: external land portion
6: central land portion, 7: internal shoulder land portion, 8: external shoulder land portion
9: first resonator, 9a: first sub-groove, 9b, 9c: first branch groove
10a: first narrow groove, 10b: second narrow groove
11: second resonator, 11a: second sub-groove, 11b: second branch groove
12: third resonator, 12a: third sub-groove, 12b: third branch groove
13: third narrow groove, 14: fourth narrow groove, 15, 16: raised bottom portion
17: fifth narrow groove, 18: sixth narrow groove, 19: seventh narrow groove, 20: eighth narrow groove
21: ninth narrow groove, 22: tenth narrow groove, 23: eleventh narrow groove
CL: tire equatorial plane, TE: tread end

The invention claimed is:

1. A pneumatic tire having an internal half of a tread surface from a tire equatorial plane in a state that the pneumatic tire is mounted on a vehicle, the internal half having a plurality of internal circumferential main grooves extending in a tread circumferential direction and an internal land portion defined by two internal circumferential main grooves adjacent to each other, and also having an external half of the tread surface from the tire equatorial plane in the state that the pneumatic tire is mounted on the vehicle, the external half having a plurality of external circumferential main grooves extending in the tread circumferential direction and an external land portion defined by two external circumferential main grooves adjacent to each other, the pneumatic tire comprising:
in the internal land portion, a plurality of first resonators, each consisting of a first sub-groove with both ends terminating in the internal land portion, and two first branch grooves, one of the first branch grooves having a groove width narrower than the first sub-groove and opening to the first sub-groove and one of the two internal circumferential main grooves, and the other of the first branch grooves having a groove width narrower than the first sub-groove and opening to the first sub-groove and the other one of the two internal circumferential main grooves; and
in the external land portion, a plurality of second resonators, each consisting of a second sub-groove with both ends terminating in the external land portion and only one second branch groove with the groove width narrower than the second sub-groove and opening to the second sub-groove and one of the two external circumferential main grooves, as well as a plurality of third resonators, each consisting of a third sub-groove with both ends terminating in the external land portion and only one third branch groove with the groove width narrower than the third sub-groove and opening to the third sub-groove and the other one of the two external circumferential main grooves, wherein
groove volumes of the second resonator and the third resonator are smaller than the groove volume of the first resonator.

2. The pneumatic tire according to claim 1, wherein the groove width of the internal circumferential main grooves is wider than the groove width of the external circumferential main grooves.

3. The pneumatic tire according to claim 1, wherein the first branch grooves, the second branch groove, and the third branch groove have the groove widths of 1 mm or less.

4. The pneumatic tire according to claim 1, comprising, on the tire equatorial plane, a land portion in a rib-like shape continuously extending in the tread circumferential direction.

5. The pneumatic tire according to claim 1, wherein the second resonators and the third resonators are alternately arranged in the tread circumferential direction.

6. The pneumatic tire according to claim 1, wherein each of first, second and third sub-grooves have a raised bottom portion.

7. The pneumatic tire according claim 6, wherein a groove depth of the first sub-groove gradually increases from a central portion in an extending direction of the groove to both ends.

8. The pneumatic tire according to claim 6, wherein the raised bottom portion of the second sub-groove is formed at one end opposite to the end to which the second branch groove opens.

9. The pneumatic tire according to claim 6, wherein the raised bottom portion of the third sub-groove is formed at one end opposite to the end to which the third branch groove opens.

10. The pneumatic tire according to claim 6, wherein the raised bottom portions have a groove depth of 3 mm to 6 mm.

11. The pneumatic tire according to claim 1, wherein narrow grooves are arranged on extensions of the second and third branch grooves in the external land portion.

12. The pneumatic tire according to claim 1, wherein the first resonators are provided only in the internal land portion, and the second and third resonators are provided only in the external land portion.

* * * * *